United States Patent Office 3,637,583
Patented Jan. 25, 1972

3,637,583
POLYESTERURETHANES STABILIZED WITH IMINOCARBONATES
Sidney H. Metzger, Jr., Leverkusen-Neuenhof, Germany, and John E. Over, Pittsburgh, Pa., assignors to Mobay Chemical Company, Pittsburgh, Pa.
No Drawing. Filed Oct. 23, 1968, Ser. No. 770,117
Int. Cl. C08g 51/60
U.S. Cl. 260—45.8 A        6 Claims

ABSTRACT OF THE DISCLOSURE

Polyester compositions stabilized against hydrolysis and ageing are prepared by incorporating therein iminocarbonate compounds.

---

This invention relates to stabilized ester containing compositions and to a process for preparing such ester containing compositions stabilized against hydrolysis and ageing. More particularly, this invention relates to stabilized polyesters, particularly to polyesterurethanes, stabilized against hydrolysis and ageing and to a process for preparing such stabilized polyesters and polyesterurethanes.

It is well known that polyurethanes of the polyesterurethane type are commonly prepared by reacting an hydroxyl terminated polyester with a polyisocyanate. These polyurethanes have many desirable qualities which make them suitable for numerous applications. However, polyesterurethanes have limited suitability for applications in hydrolytic environments because of property losses which can result from hydrolysis of the ester group of the polymer chain. The change in properties is a serious matter and has impeded exploitation of such polyesterurethanes. Various techniques have been proposed in order to improve the stability of esters, polyesters, polyesteramides and polyesterurethanes against hydrolysis and ageing. One such technique is to incorporate into esters, polyesters, polyesteramides and polyesterurethanes, either chemically or mechanically, compounds such as carbodiimides or silicones. These materials, while they perform adequately, are expensive and difficult to prepare because of their exotic chemical structure. The carbodiimides proposed for this purpose show a tendency to react with water and hydroxyl compounds and thus their stabilizing action is partially destroyed. Further, carbodiimides have a tendency to form addition compounds with isocyanates, such as uretonimines, thereby further reducing the effectiveness of the carbodiimides. Additionally, the carbodiimides are generally only able to be incorporated into the compositions after the formation of the composition is completed.

It is, therefore, an object of this invention to provide esters, polyesters, polyesteramides and polyesterurethanes devoid of the foregoing problems and disadvantages. A further object of this invention is to provide polyesterurethanes stabilized against hydrolysis and ageing. An additional object of this invention is to provide a method of stabilizing esters, polyesters, polyesteramides and polyesterurethanes against hydrolysis and ageing. A still further object of this invention is to provide molded articles of esters, polyesters, polyesteramides and polyesterurethanes stabilized against hydrolysis and ageing.

The foregoing objects and others which will become apparent from the following description are accomplished in accordance with this invention, generally speaking, by providing compositions containing ester groups stabilized against hydrolysis and ageing by incorporating therein a stablizing amount of an iminocarbonate. More particularly, the invention contemplates the stabilization of esters, polyesters, polyesteramides and polyesterurethanes having repeating ester linkages in the chain by incorporating therein a stabilizing amount of an iminocarbonate.

Any composition containing repeating ester linkages

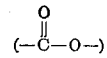

in the chain may be stabilized against hydrolytic degradation by the introduction of iminocarbonates in accordance with this invention such as, for example, the reaction product of a carboxylic acid with an alcohol. Any suitable carboxylic acid may be used in the preparation of compositions containing ester groups in accordance with this invention such as, for example, acetic acid, propionic acid, phenyl acetic acid, benzoyl acetic acid, pyruvic acid, propionyl acetic acid, butryl formic acid, aceto butyric acid, levulinic acid, 1,2-keto stearic acid, 1,3-keto behenic acid, aldovaleric acid, hexahydrobenzoic acid, 1,2-cyclohexanone carboxylic acid, brassylic acid, phenyl malonic acid, ethyl glycollic acid, thiodiglycollic acid, β-chloropropionic acid, glutaconic acid, ethoxymalonic acid, malic acid, aspartic acid, acrylic acid, methacrylic acid, cinnamic acid, benzene tricarboxylic acid, adipic acid, succinic acid, suberic acid, sebacic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid and the like.

Any suitable alcohol may be used such as, for example, methyl alcohol, ethyl alcohol, propyl alcohol, isopropyl alcohol, n-butyl alcohol, isobutyl alcohol, secondary butyl alcohol, tertiary butyl alcohol, amyl alcohol, hexyl alcohol, octyl alcohol, decyl alcohol, lauryl alcohol, myristyl alcohol, cetyl alcohol, stearyl alcohol, allyl alcohol, methallyl alcohol, crotyl alcohol, 2-propyn-1-ol, oleyl alcohol, geraniol, citronellol, linalool, diacetone alcohol, ethylene glycol monoethyl ether, cyclohexanol, naphthenic alcohols, benzyl alcohol, tolyl alcohol, phenyl ethyl alcohol, octadecylbenzyl alcohol, ethylene glycol, propylene glycol, 1,4 - butanediol, 1,3 - butanediol, 1,5-pentanediol, 1,6-hexanediol, bis-(hydroxy methyl chlorohexane), diethylene glycol, 2,2-dimethyl propylene glycol, 1,3,6 - hexanetriol, trimethylol propane, pentaerythritol, sorbitol, glycerine and the like. The method of stabilizing compositions containing ester groups is applicable not only to monoesters but also to polyesters in accordance with the compounds listed above having a functionality greater than 1. For example, where any of the di- or polycarboxylic acids are reacted with the di- or polyhydric alcohols, a polyester having more than 1 ester group, of course, will result.

Of course, other compositions containing polyester resins as a reaction component or in admixture can also be stabilized by the process of this invention. For example, compositions such as polyesteramides and polyesterurethanes can be stabilized. The reaction product of any of the hydroxyl terminated esters set forth above can be reacted with a suitable isocyanate to prepare a polyurethane. In the preparation of polyesteramides, the reaction of a carboxylic acid, an alcohol and an amine can be carried out simultaneously or in steps in the manner set forth for the preparation of polyesteramides. Of course, aminoalcohols and aminoacids can be used in the preparation of polyesteramides. The pertinent feature is, however, that any composition containing ester groups can be stabilized against hydrolysis by the introduction thereto of an iminocarbonate.

Any suitable polyisocyanate can be used in the preparation of a polyesterurethane by reaction with a hydroxyl polyester such as tetramethylene diisocyanate, hexamethylene diisocyanate, 1,4-phenylene diisocyanate, 1,3-phenylene diisocyanate, 1,4-cyclohexylene diisocyanate, 2,5-tolylene diisocyanate, 2,4-tolylene diisocyanate, 2,6-tolylene diisocyanate, isomeric mixtures of 2,4-tolylene diisocyanate and 2,6-tolylene diisocyanate, particularly a mixture of about 80% 2,4-tolylene diisocyanate and 20% 2,6-tolylene diisocyanate, 3,5-tolylene diisocyanate, 4-chloro-1,3-phenylene diisocyanate, 1-methoxy-2,4-phenylene diisocyanate, 1-methyl-3,5-diethyl-2,6-phenylene diisocyanate, 1,3,5-triethyl-2,4-phenylene diisocyanate, 1-methyl-3,5-diethyl-2,4-phenylene diisocyanate, 1,3,5-diethyl-6-chloro-2,4-phenylene diisocyanate, 6-methyl-2,4-diethyl-5-nitro-1,3-phenylene diisocyanate, p-xylylene diisocyanate, m-xylylene diisocyanate, 4,6-dimethyl-1,3-xylylene diisocyanate, 1,3 - dimethyl-4,6-bis-(beta-isocyanatoethyl)benzene, 3 - (alpha - isocyanatoethyl)phenylisocyanate, 1-methyl-2,4-cyclohexylene diisocyanate, 4,4'-biphenylene diisocyanate, 3,3'-dimethyl-4,4'-biphenylene diisocyanate, 3,3'-dimethoxy-4,4'-biphenylene diisocyanate, 3,3'-diethoxy-4,4'-biphenylene diisocyanate, 4,4'-diisocyanato diphenylether, 4,4'-diisocyanato dicyclohexylmethane, 4,4'-diisocyanato diphenylmethane, mixtures of 4,4-diisocyanato diphenylmethane and higher functional polyphenylmethylene functional polyphenylmethylene polyisocyanates, especially a mixture of 40% to 60% diphenylmethane diisocyanate, 20 to 30% triisocyanates, 8 to 17% tetraisocyanates and 5 to 30% penta or higher polyisocyanates, 4,4'-diisocyanato-3,3'-dimethyldiphenylmethane, 4,4'-diisocyanato - 3,3' - dichlorodiphenylmethane, 4,4'-diisocyanato diphenyldimethylmethane, 1,5-naphthylene diisocyanate, 1,4-naphthylene diisocyanate, furfurylidene diisocyanate, 2,4,4'-triisocyanato diphenylether, 2,4,6-triisocyanato-1-methyl-3,5-diethyl benzene, and the like.

Any suitable amino compound can be used to prepare polyesteramides such as, for example, hexamethylene diamine, ethylene diamine, propylene diamine, butylene diamine, cyclohexylene diamine, phenylene diamine, tolylene diamine, xylylene diamine, 4,4'-diamino-diphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid, and the like. Of course, the amino compounds may be reacted either simultaneously with the ester forming components or sequentially therewith.

It is also within the scope of this invention that naturally occurring esters may be stabilized against hydrolysis and ageing in accordance with this invention such as, for example, castor oil, cocoanut oil, corn oil, cottonseed oil, horse fat oil, lard oil, wool fat, japan wax, mutton tallow, beef tallow, neat's-foot oil, palm oil, peanut oil, carnauba wax, spermaceti, beeswax, rapeseed oil, soya bean oil, whale oil, sperm oil and the like. Further, any compositions containing ester groups as well as unsaturation may be stabilized in accordance with this invention. Such compositions may be formed by polymerization, condensation or a combination of both. Any of those unsaturated carboxylic acids mentioned above may be used in the preparation of such polyesters. Further examples of such compositions include polyester resins of polymerizable monomers and unsaturated polyesters, for example, those of fumaric or maleic acid as well as ethylene vinyl ester copolymers, acrylic and methacrylic acid ester polymers and their copolymers with vinyl esters, fluorinated acrylic esters and their copolymers, copolymers of acrylonitrile and acrylic acid esters such as methylacrylate and the like. The invention is particularly applicable to the stabilization of polyesters used in the manufacture of synthetic resins which may result in the form of lacquers, foils, coatings, fibers, foam materials, elastomers or casting resins for molded elements.

Any suitable N-substituted iminocarbonate such as those having the formula

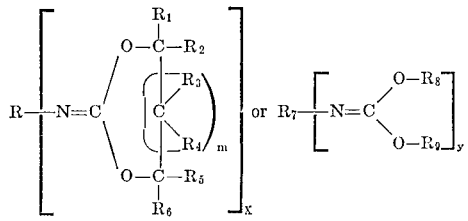

wherein R, $R_7$, $R_8$ and $R_9$ are each organic radicals which may be saturated or unsaturated; $R_1$, $R_2$, $R_3$, $R_4$, $R_5$ and $R_6$ may each be either hydrogen atoms or organic radicals which may be saturated or unsaturated; $m$ is 0 or a positive integer and $x$ and $y$ are integers of from 1 to 4, may be used according to this invention. The radicals R, $R_7$, $R_8$ and $R_9$ may each be any suitable organic radicals such as straight or branched chain aliphatic, cycloaliphatic, aromatic or heterocyclic radicals and the radicals $R_1$, $R_2$, $R_3$, $R_4$, $R_5$ and $R_6$ may each be either hydrogen atoms or any suitable organic radicals such as straight or branched chain aliphatic, cycloaliphatic, aromatic or heterocyclic radicals. Preferably, R, $R_7$, $R_8$ and $R_9$ are each aliphatic, cycloaliphatic, or aromatic hydrocarbon radicals containing up to about 20 carbon atoms; $R_1$, $R_2$, $R_3$, $R_4$, $R_5$ and $R_6$ are each hydrogen atoms or aliphatic, cycloaliphatic or aromatic hydrocarbon radicals containing up to 20 carbon atoms; $x$ and $y$ are 1 or 2 and $m$ is 0 or 1. It is to be recognized that the preferred hydrocarbon radicals may be substituted with radicals non-reactive with isocyanato groups. Most preferably, R, $R_7$, $R_8$ and $R_9$ are each alkyl, alkylene, alkenyl, alkenylene, cycloalkylalkylene, cycloalkenylalkylene, arylalkylene, arylalkyl, arylalkenyl, cycloalkyl, cycloalkylene, cycloalkenyl, cycloalkenylene, alkylcycloalkylene, alkylcycloalkenylene, alkylcycloalkenyl, arylcycloalkylene, aryl, arylene, alkylaryl, arylalkylenearyl, cycloalkylaryl, cycloalkylarylene, alkenylaryl or cycloalkenylaryl radicals which may be substituted with radicals non-reactive with isocyanato groups and $R_1$, $R_2$, $R_3$, $R_4$, $R_5$ and $R_6$ are each hydrogen atoms or alkyl, alkylene, alkenyl, alkenylene, cycloalkylalkylene, cycloalkenylalkylene, arylalkylene, arylalkyl, arylalkenyl, cycloalkyl, cycloalkylene, cycloalkenyl, cycloalkenylene, alkylcycloalkylene, alkylcycloalkenylene, alkylcycloalkenyl, arylcycloalkylene, aryl, arylene, alkylaryl, arylalkylenearyl, cycloalkylaryl, cycloalkylarylene, alkenylaryl or cycloalkenylaryl radicals which may be substituted with radicals non-reactive with isocyanato groups. As examples of substituents non-reactive with isocyanate groups, there may be mentioned radicals such as, for example, halogen such as fluorine, chlorine, bromine and iodine, nitro, cyano, thiocarbonyl, lower alkoxy containing from 1 to about 6 carbon atoms, alkyl radicals containing up to about 12 carbon atoms, carboalkoxy containing from 2 to about 6 carbon atoms and the like.

As examples of the radicals which R and $R_7$ may represent, there may be mentioned mono-, di-, tri- or tetravalent forms of methyl, ethyl, propyl, butyl, amyl, dodecyl, stearyl, eicosyl, allyl, 2-butenyl, cyclopentyl, cyclohexyl, methylcyclohexyl, cyclohexenyl, methylcyclohexenyl, phenylcyclohexyl, phenyl, chlorophenyl, nitrophenyl, cyanophenyl, carbethoxyphenyl, anisyl, naphthyl, anthryl, benzyl, styryl, diphenylalkyl such as diphenylmethane, triphenylalkyl such as triphenylmethane radicals and the like which may contain substituents non-reactive with isocyanato groups. $R_8$ and $R_9$ may be any of these radicals in their monovalent form. As examples of radicals which $R_1$, $R_2$, $R_3$, $R_4$, $R_5$ and $R_6$ may represent there may be mentioned hydrogen, methyl, ethyl, propyl, butyl, amyl, dodecyl, stearyl, eicosyl, allyl, 2-butenyl, cyclopentyl, cyclohexyl, methylcyclohexyl, cyclohexenyl, methylcyclohexenyl, phenylcyclohexyl, phenyl, chlorophenyl, nitrophenyl, cyanophenyl, carbethoxyphenyl, anisyl, naphthyl, anthryl, benzyl, styryl, diphenylalkyl such as diphenylmethane, triphenylalkyl such as triphenylmethane radicals and the like which may contain substituents non-reactive with isocyanato groups.

Especially preferred for the process of this invention are compounds of the formula

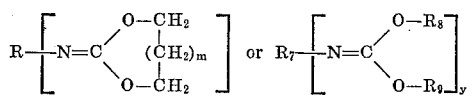

wherein R, $R_7$, $R_8$ and $R_9$ are alkyl, cycloalkyl, phenyl, alkyl substituted phenyl, naphthyl, benzyl or diphenylalkane radicals, which radicals may contain substituents non-reactive with isocyanato groups, $m$ is 0 or 1 and $x$ and $y$ are integers of 1 to 4. Most especially preferred are compounds of the above formulae wherein $x$ and $y$ are either 1 or 2.

As examples of particularly suitable iminocarbonates there may be mentioned ethylene-N-phenyliminocarbonate, ethylene - N-cyclohexyliminocarbonate, ethylene-N-ethyliminocarbonate, ethylene - N-hexyliminocarbonate, ethylene-N-stearyliminocarbonate, ethylene-N-allyliminocarbonate and the corresponding propylene iminocarbonates and the like; dimethyl-N- phenyliminocarbonate, diethyl - N-phenyliminocarbonate, dihexyl-N-phenyliminocarbonate, distearyl-N-phenyliminocarbonate, dicyclohexyl-N-phenyliminocarbonate, diethyl-N-ethyliminocarbonate, diethyl-N-cyclohexyliminocarbonate and the like.

Also iminocarbonates, such as, for example,
diphenylmethane-4,4'-bis(ethylene iminocarbonate),
triphenylmethane-4,4',4''-tris(ethylene iminocarbonate),
toluene-2,4-bis(ethylene iminocarbonate),
toluene-2,6-bis(ethylene iminocarbonate),
toluene-2,6-bis(propylene iminocarbonate),
hexahydrotoluene-2,4-bis(ethylene iminocarbonate),
toluene-2,6-bis(diethyl iminocarbonate),
toluene-2,4,6-tris(diethyl iminocarbonate),
benzene-1,3,5-tris(diethyl iminocarbonate),
diphenylmethane-4,4'-bis(diethyl iminocarbonate),
phenylene-1,4-bis(ethylene iminocarbonate),
phenylene-1,4-bis(diethyl iminocarbonate),
hexamethylene-1,6-bis(ethylene iminocarbonate),
hexamethylene-1,6-bis(dimethyl iminocarbonate),
cyclohexylene-1,4-bis(diethyl iminocarbonate),
3,5-dichloro toluene-2,4-bis(ethylene iminocarbonate),
biphenylene-4,4'-bis(ethylene iminocarbonate),
decamethylene-1,10-bis(diethyl iminocarbonate),
ethylene bis(diethyl iminocarbonate),
3,3'-dimethylbiphenyl-4,4'-bis(diethyl iminocarbonate),
3,3'-dimethoxybiphenyl-4,4'-bis(diethyl iminocarbonate),
3,3'-diphenylbiphenyl-4,4'-bis(diethyl iminocarbonate),
3,3'-dichlorobiphenyl-4,4'-bis(diethyl iminocarbonate),
hexane-1,2,6-tris(diethyl iminocarbonate),
2,2'-dichlorodiphenylmethane-4,4'-bis(propylene iminocarbonate),
2,2'-dichlorodiphenylmethane-4,4'-bis(dipropyl iminocarbonate),
2,5'-dimethyldiphenylmethane-2,2',4,4'-tetra(diethyl iminocarbonate)

and the like may be employed in the process of this invention.

As additional examples of other N-substituted iminocarbonates there may be mentioned, for example, diethyl-N-benzyliminocarbonate,
diethyl-N-2-methylbenzyliminocarbonate,
diethyl-N-2-bromobenzyliminocarbonate,
diethyl-N-2-nitrobenzyliminocarbonate,
diethyl-N-2,4-dichlorobenzyliminocarbonate,
diethyl-N-3-nitrobenzyliminocarbonate,
diethyl-N-3-methylbenzyliminocarbonate,
diethyl-N-2-thenyliminocarbonate,
diethyl-N-3-methyl-2-thenyliminocarbonate,
dimethyl-N-benzyliminocarbonate,
di-n-propyl-N-benzyliminocarbonate,
methyl-n-propyl-N-benzyliminocarbonate,
diethyl-N-phenylthiocarbamoyliminocarbonate,
diethyl-N-ethoxyethyliminocarbonate,
diethyl-N-methoxyethyliminocarbonate,
diethyl-N-2-phenylethyliminocarbonate,
diethyl-N-2-furfuryliminocarbonate,
diethyl-N-4-bromobenzyliminocarbonate,
diethyl-N-ethoxycarbonylmethyliminocarbonate,
diethyl-N-allyliminocarbonate,
diethyl-N-phenoxypropyliminocarbonate,
diethyl-N-phenylcarbamoyliminocarbonate and the like.

Iminocarbonates are known compounds and may be prepared, for example, by the reaction of a corresponding N-substituted isocyandihalide with an alkil metal alcoholate according to procedures known in the art. For example, ethylene - N-phenyliminocarbonate is prepared by reacting phenyl isocyandihalide with sodium ethylene glycolate and ethyl-N-cyclohexyliminocarbonate is prepared by reacting cyclohexyl isocyandihalide and sodium ethylene glycolate in benzene with stirring and refluxing. The product is poured into water, extracted with benzene, and the benzene removed by distillation under a reduced pressure to yield the iminocarbonate product. Similarly dimethyl N-phenyliminocarbonate is prepared from phenyl isocyandichloride and sodium methoxide. Additionally, the N-substituted iminocarbonates of this invention may be produced by reacting an isocyanate with an N-unsubstituted iminocarbonate with the reaction occurring very readily at room temperature desirably in ether and with agitation. It is also possible to prepare iminocarbonate suitable for the process of this invention by reacting a salt of a primary amine with an N-unsubstituted iminocarbonate with the reaction occurring very readily at room temperature, generally within a range of from $-10°$ C. to $+30°$ C., desirably in an aqueous or aqueous/ alcoholic medium, so that the N-substituted iminocarbonate which is produced is precipitated. Advantageously the amine is used in the form of a hydrogen halide salt.

While it is contemplated that any suitable stabilizing amount of the iminocarbonate may be incorporated in the esters to stabilize the ester containing compositions, it is preferred that the iminocarbonate component be added in a quantity of from about 0.001% to about 10% by weight based on the weight of the polyester; more preferably from about 0.01% to about 5%, and most preferably from about 0.1% to about 3% by weight of iminocarbonate is employed.

It is possible to add the iminocarbonate either to the starting components used in preparation of the ester, to an intermediate which may be used in the process of preparing the ester or, the iminocarbonate may be added after the preparation of the ester is completed. In the event that the ester or polyester is used in further reactions with other compounds such as, for example, the reaction with an organic polyisocyanate to prepare polyurethanes, the iminocarbonate can also be added before, during the course of or after this reaction takes place. The addition can also be made with the iminocarbonates in the liquid or solid state by rolling, milling, stirring or any other suitable technique.

The stabilization of ester containing compositions in accordance with this invention is advantageous for the reason that the iminocarbonates show an increased effectiveness in stabilizing ester containing compositions against the effects of hydrolytic degradation. The stabilized ester compositions of this invention may be used in application where the esters have heretofore been employed as well as in applications where the compositions will be exposed to conditions of hydrolysis.

The invention is further illustrated but is not intended to be limited by the following examples in which all parts and percentages are by weight unless otherwise specified.

EXAMPLE 1

To about 500 parts of an anhydrous polyester prepared from about 10 mols adipic acid and about 11 mols ethylene glycol and having a molecular weight of about 2000, a hydroxyl number of about 56 and an acid number of less than about 2, is added about 10 parts (2%) by weight of ethylene-N-phenyliminocarbonate. An isocyanate terminated prepolymer is prepared by the addition of about 200 parts of 4,4'-diisocyanato diphenylmethane to the polyester at a temperature of about 72° C. until the NCO content is about 6.05%. Elastomeric slabs suitable for testing (6" x 6") are prepared by mixing 300 parts of the prepolymer (degassed) with about 18.9 parts of 1,4-butanediol at a temperature of about 105° C. for about 45 seconds and pouring the melt into molds heated to a temperature of about 120° C. After about 40 minutes the elastomer was removed from the molds and further cured at about 110° C. for about 18 hours.

A control sample and elastomeric slabs therefrom are prepared in an identical manner without the addition of ethylene-N-phenyliminocarbonate to the polyester.

After storage for several days at room temperature, the elastomeric slab samples were subjected to accelerated hydrolysis and ageing conditions with 15 p.s.i.g. steam at about 120° C. and 100% relative humidity for periods of 0, 5 and 15 hours.

The control samples exhibit the following physical properties:

| Ageing in hours | Before hydrolysis | 5 | 15 |
|---|---|---|---|
| Tensile strength, p.s.i. | 7,600 | 5,900 | 550 |
| Elongation at break, percent | 600 | 620 | 150 |

The stabilized samples containing ethylene-N-phenylaminocarbonates exhibit the following physical properties:

| Ageing in hours | Before hydrolysis | 5 | 15 |
|---|---|---|---|
| Tensile strength, p.s.i. | 6,200 | 6,200 | 4,000 |
| Elongation at break, percent | 580 | 600 | 600 |

EXAMPLE 2

To about 500 parts of an anhydrous polyester prepared from about 10 mols adipic acid and about 11 mols ethylene glycol and having a molecular weight of about 2000, a hydroxyl number of about 56 and an acid number of less than about 2 is added 200 parts of 4,4'-diisocyanato diphenylmethane at a temperature of about 72° C. to prepare an isocyanate terminated prepolymer. About 300 parts of the isocyanate terminated prepolymer is degassed and cooled to about 105° C. and mixed with about 21.2 parts of 1,4-butanediol containing 2.2 parts ethylene N-phenyliminocarbonate (1% based on the weight of polyester) at about 105° C. for about 40 seconds and the melt is poured into molds heated to a temperature of about 120° C. After about 45 minutes the elastomer slabs (6" x 6") are demolded and heated to about 110° C. for about 18 hours.

Slabs from a second sample are prepared in an identical manner with the addition of about 21.2 parts of 1,4-butanediol containing about 6.6 parts ethylene N-phenyliminocarbonate (3% based on the weight of polyester) to about 300 parts of the isocyanate terminated prepolymer.

In an identical manner control slabs are prepared from a third sample by the addition of about 21.2 parts of 1,4-butanediol containing no additive to about 300 parts of the isocyanate terminated prepolymer.

The elastomer slabs were subjected to accelerated hydrolysis and ageing conditions with 15 p.s.i.g. steam at about 120° C. and 100% relative humidity for periods of 0, 5, 16 and 24 hours. The stabilized elastomers containing 1% stabilizer have the following properties:

| Ageing in hours | Before hydrolysis | 5 | 16 | 24 |
|---|---|---|---|---|
| Tensile strength, p.s.i. | 2,900 | 2,600 | 1,900 | 1,700 |
| Elongation at break, percent | 525 | 550 | 550 | 500 |

The stabilized elastomers containing 3% stabilizer have the following properties:

| Ageing in hours | Before hydrolysis | 5 | 16 | 24 |
|---|---|---|---|---|
| Tensile strength, p.s.i. | 4,600 | 4,100 | 3,800 | 2,700 |
| Elongation at break, percent | 525 | 600 | 650 | 500 |

The control samples containing no stabilizer have the following properties:

| Ageing in hours | Before hydrolysis | 5 | 16 | 24 |
|---|---|---|---|---|
| Tensile strength, p.s.i. | 5,000 | 3,800 | 2,200 | 1,000 |
| Elongation at break, percent | 575 | 630 | 600 | 300 |

EXAMPLE 3

An elastomer is prepared by mixing, at a temperature of about 105° C., 300 parts of a degassed isocyanate terminated prepolymer, prepared from about 500 parts of an anhydrous polyester from about 10 mols of adipic acid and about 11 mols ethylene glycol and having a molecular weight of about 2000, a hydroxyl number of about 56 and an acid number of less than about 2 and 200 parts of 4,4-diisocyanato diphenylmethane, with about 21.2 parts of 1,4-butanediol containing about 2.2 parts dimethyl N-phenyliminocarbonate (1% based on the weight of polyester) for about 45 seconds and pouring the melt into molds heated to a temperature of about 120° C. After about 45 minutes the elastomer slabs are demolded and heated to about 110° C. for about 18 hours. In a similar manner elastomer slabs are prepared as a control with the addition of about 21.2 parts 1,4-butanediol containing no dimethyl N-phenyliminocarbonate to about 300 parts of the degassed isocyanate terminated prepolymer.

The elastomer slabs are subjected to accelerated hydrolysis and ageing conditions with 15 p.s.i.g. steam at about 120° C. and 100% relative humidity for periods of 0, 5 and 8 hours. The stabilized elastomer slabs have the following properties:

| Ageing in hours | Before hydrolysis | 5 | 8 |
|---|---|---|---|
| Tensile strength, p.s.i. | 3,600 | 3,600 | 3,600 |
| Elongation at break, percent | 560 | 600 | 610 |

The control samples containing no stabilizer have the following properties:

| Ageing in hours | Before hydrolysis | 5 | 8 |
|---|---|---|---|
| Tensile strength, p.s.i. | 5,000 | 3,800 | 2,200 |
| Elongation at break, percent | 575 | 630 | 600 |

EXAMPLE 4

A polyurethane elastomer is prepared by adding, at a temperature of about 105° C., about 21.2 parts of 1,4-butanediol to about 300 parts of a degassed isocyanate terminated prepolymer prepared from about 500 parts of an anhydrous polyester, from about 10 mols adipic acid and about 11 mols ethylene glycol and having a molecular weight of about 2000, a hydroxyl number of about 56 and an acid number of less than about 2, and 200 parts of 4,4'-diisocyanato-diphenylmethane, and curing. About 70 parts of the polyurethane elastomer are mixed at a temperature of about 188° C. for about 30 minutes in a Brabender mixer with about 2% based on the weight of polyester of ethylene N-phenyliminocarbonate and sheets of about ⅛ inch thickness are compression molded from the stabilized elastomer. The compression molded sheets are creamy white in color. In a similar manner about 70 parts of the polyurethane elastomer containing no stabilizer are mixed in a Brabender mixer at a temperature of about 188° C. for about 30 minutes and formed into ⅛ inch thick sheets by compression molding. The compression molded sheets are yellow in color.

The stabilized and unstabilized sheets were subjected to identical accelerated hydrolysis and ageing with 15 p.s.i.g. steam at 100% relative humidity for a period of about 24 hours. After 24 hours of ageing the unstabilized samples failed, that is, they were extremely brittle and possessed no elastic properties, whereas the stabilized samples were very elastic, having an elongation at break of about 230%.

In a similar manner any of the above-mentioned suitable ester containing compositions may be stabilized with the other suitable iminocarbonate compounds such as, for example, ethylene-N-cyclohexylimino carbonate, ethylene-N-hexylimino carbonate, diethyl-N-phenylimino carbonate and the like or any of those iminocarbonates set forth hereinbefore.

It can be readily seen that the iminocarbonates have a pronounced stabilizing action on compositions containing ester groups. Any of the iminicarbonates set forth above may be used in the working examples in place of those used therein. Also, any compositions containing ester groups can be used throughout the examples in place of those specifically used therein.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A stabilized composition comprising polyester urethanes and a stabilizing amount of an N-substituted iminocarbonate selected from the group of compounds having the formula

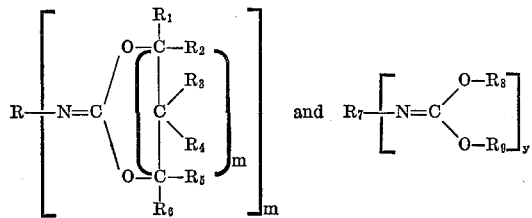

wherein R, $R_7$, $R_8$ and $R_9$ are each selected from the group consisting of aliphatic, cycloaliphatic, aromatic, furfuryl and thenyl radicals; $R_1$, $R_2$, $R_3$, $R_4$, $R_5$ and $R_6$ are each selected from the group consisting of hydrogen atoms, aliphatic, cycloaliphatic, aromatic, furfuryl and thenyl radicals; $m$ is 0 or a positive integer and $x$ and $y$ are integers of from 1 to 4.

2. The stabilized composition of claim 1 wherein the N-substituted iminocarbonate is present in an amount of from about 0.001 percent to about 10 percent based on the weight of the ester containing composition.

3. The stabilized composition of claim 1 wherein each of R, $R_7$, $R_8$ and $R_9$ is a member selected from the group consisting of alkyl, cycloalkyl, phenyl, alkyl substituted phenyl or diphenyl alkane radicals; each of $R_1$, $R_2$, $R_3$, $R_4$, $R_5$ and $R_6$ is a member selected from the group consisting of hydrogen atoms and alkyl, cycloalkyl or phenyl radicals, $m$ is 0 or 1 and $x$ and $y$ are integers of 1 or 2.

4. The stabilized composition of claim 3 wherein each of $R_1$, $R_2$, $R_3$, $R_4$, $R_5$ and $R_6$ are hydrogen atoms.

5. The stabilized composition of claim 1 wherein the iminocarbonate is ethylene N-phenyliminocarbonate.

6. The stabilized composition of claim 1 wherein the iminocarbonate is dimethyl N-phenyliminocarbonate.

References Cited

UNITED STATES PATENTS

| | | | |
|---|---|---|---|
| 3,148,163 | 9/1964 | Freyermuth | 260—2.5 |
| 3,268,482 | 8/1966 | Piirma et al. | 260—75 |
| 3,401,144 | 9/1968 | Britain | 260—45.8 |
| 3,401,201 | 9/1968 | Walton | 260—566 |

OTHER REFERENCES

S.C.I. Monograph No. 13, "High Temperature Resistance and Thermal Degradation of Polymers," 1961, pages 213, 214, 215 and 387.

DONALD E. CZAJA, Primary Examiner

R. A. WHITE, Assistant Examiner

U.S. Cl. X.R.

260—2.5 BB, 45.9 R, 77.5 R